United States Patent [19]

Stumpf

[11] Patent Number: 4,566,926

[45] Date of Patent: Jan. 28, 1986

[54] METHOD AND APPARATUS FOR MANUFACTURING INNERSPRING CONSTRUCTIONS

[75] Inventor: Walter Stumpf, Dunwoody, Ga.

[73] Assignee: Simmons U.S.A. Corporation, Atlanta, Ga.

[21] Appl. No.: 695,311

[22] Filed: Jan. 28, 1985

Related U.S. Application Data

[63] Continuation-in-part of Ser. No. 586,867, Mar. 9, 1984.

[51] Int. Cl.[4] .............. B23K 19/04

[52] U.S. Cl. .............. 156/165; 156/296; 156/356; 156/558

[58] Field of Search .............. 156/556–559, 156/566, 578, 512, 297, 296, 292, 548, 164, 165, 560–561, 356

[56] References Cited

U.S. PATENT DOCUMENTS

| | | | |
|---|---|---|---|
| 2,409,777 | 10/1946 | Maurer | 156/558 |
| 2,537,918 | 1/1951 | Skoog | 156/558 |
| 2,862,214 | 12/1958 | Thompson et al. | 5/477 X |
| 3,388,020 | 6/1968 | Gates | 156/558 |
| 3,579,399 | 5/1971 | Ehe | 156/558 X |
| 4,401,501 | 8/1983 | Stumpf | 156/367 |

*Primary Examiner*—David Simmons

*Attorney, Agent, or Firm*—A. Thomas Kammer

[57] ABSTRACT

A method and apparatus are provided for assembling innerspring constructions from rows of pocketed coil springs. The apparatus includes a surface for supporting the rows and a pressure plate which compresses them slightly while holding them in straight lines. After each row is positioned between the surface and the plate, a hot melt applicator is passed thereby and deposits a selected amount of bonding material to the fabric encasing each coil spring. New rows are pushed into contact with the treated rows and each displaces them by about one coil spring diameter. A plurality of rows are maintained under compression at all times to insure they remain in alignment with adequate frictional contact therebetween. A bar having markings corresponding to each pocketed coil spring within a row is mounted to the apparatus. A beam switch or the like is provided for detecting these markings and actuating the applicator at a selected time as it passes each spring.

25 Claims, 4 Drawing Figures

METHOD AND APPARATUS FOR MANUFACTURING INNERSPRING CONSTRUCTIONS

CROSS REFERENCE TO RELATED APPLICATION

This application is a continuation-in-part of application Ser. No. 586,867 filed Mar. 9, 1984.

BACKGROUND OF THE INVENTION

1. Field of the Invention

The field of the invention relates to a method for assembling innerspring constructions of pocketed coil springs and an apparatus for practicing the method.

2. Brief Description of the Prior Art

Pocketed coil springs have been employed in the assembly of innerspring constructions for many years. The connection of such coil springs has evolved from early constructions where links and hog rings were used to secure adjacent springs. U.S. Pat. Nos. 698,529 and 2,320,153 disclose such constructions. The utilization of rings is slow and expensive as the operator not only has to position the coils, but also must apply the ring by piercing the pocket wrap material while catching the wire defining the top convolution of the coil spring.

A manufacturing process having greater efficiency than the above was developed wherein a length of connected pocketed coil springs is positioned in a sinuous pattern on a rack. Lengths of twine are pulled through each row of pocketed springs thereby connecting them. The twine is then tied off by the operator. Tightness of the construction is dependent upon operator skill. This method remains in use today and improved equipment has been developed therefor. U.S. Pat. No. 4,393,792 discloses an apparatus which improves the efficiency of the basic method.

More recently, an apparatus has been developed for ultrasonically bonding rows of pocketed coil springs together to form an arrangement as shown in U.S. Pat. No. 4,234,984. U.S. Pat. No. 4,401,501 discloses such an apparatus.

SUMMARY OF THE INVENTION

A method and apparatus have been developed in accordance with the invention for manufacturing innerspring constructions in a significantly different manner from those previously commercially employed in conjunction with pocketed coil springs. An innerspring construction is provided which includes a plurality of connected rows of pocketed coil springs, the connections being formed by lines of adhesive or bonding material, both terms being used interchangeably herein. Hot melt is preferably employed for row connection.

The apparatus includes a support surface upon which a row of connected pocketed coil springs is placed. An applicator is provided for traversing the row of coil springs and depositing a selected amount of adhesive on the pocket material enveloping each spring. The adhesive is applied in selected amounts and patterns. Means are provided for moving another row of pocketed coil springs into contact with the treated row, thereby causing them to be joined by the adhesive. Adhesive is again applied to the exposed surface of the most recently added row. Further rows are moved into position and treated until an innerspring construction of desired size has been completed. A new construction may be started by simply omitting one adhesive application so that two adjacent rows are not joined.

In a preferred embodiment of the invention, the support surface of the apparatus is substantially horizontal and the rows are secured to each other in the upright position. Each row is compressed slightly between two plates to insure precise positioning as the adhesive applicator traverses it and to create a sufficient amount of pressure between a treated row and a new row moved into contact therewith.

DETAILED DESCRIPTION OF THE INVENTION

Figure 1A:
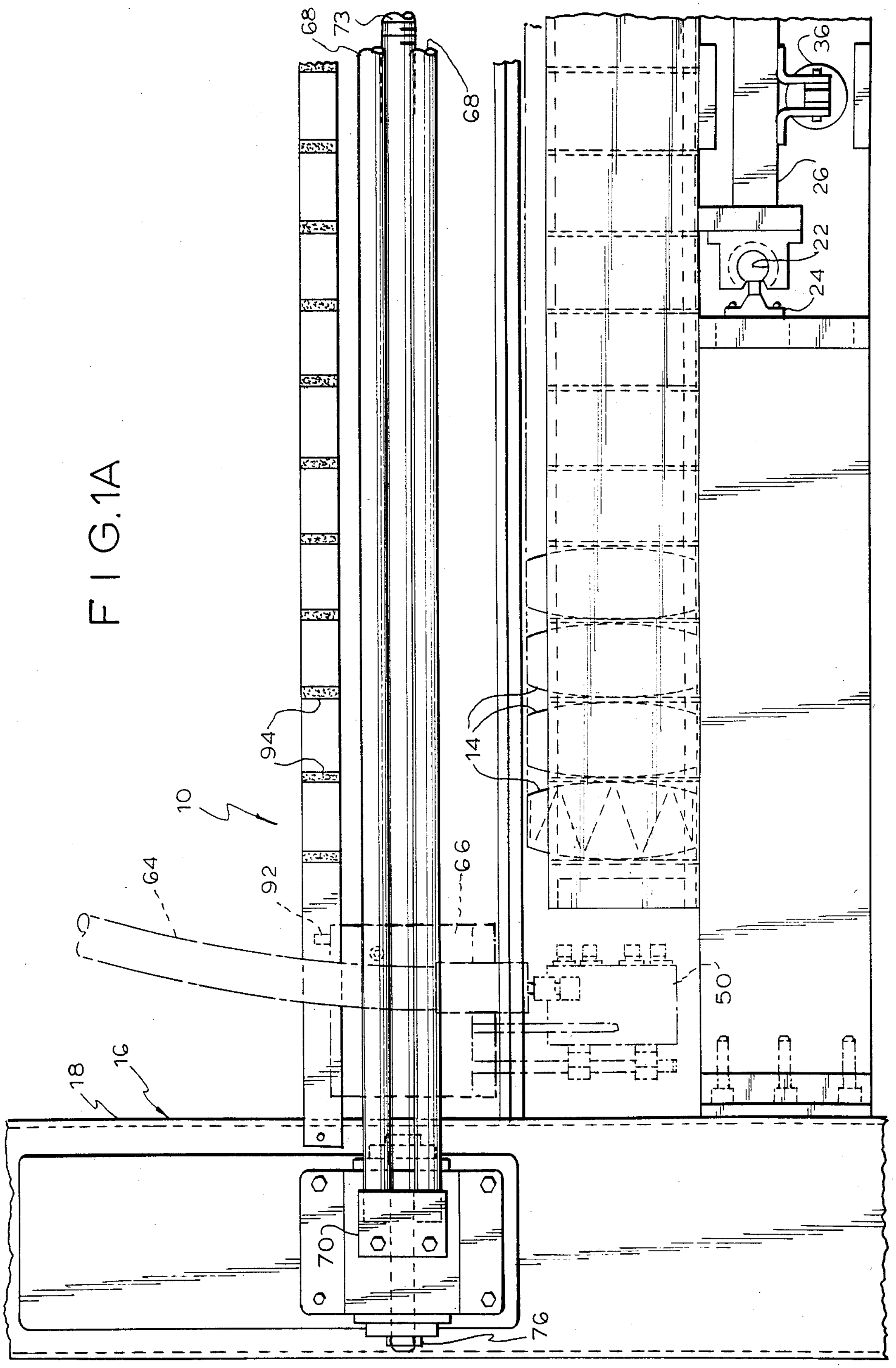
FIGS. 1A and 1B are each front elevation views of the left and right sides, respectively, of an apparatus for manufacturing innerspring constructions.
Figure 1B:
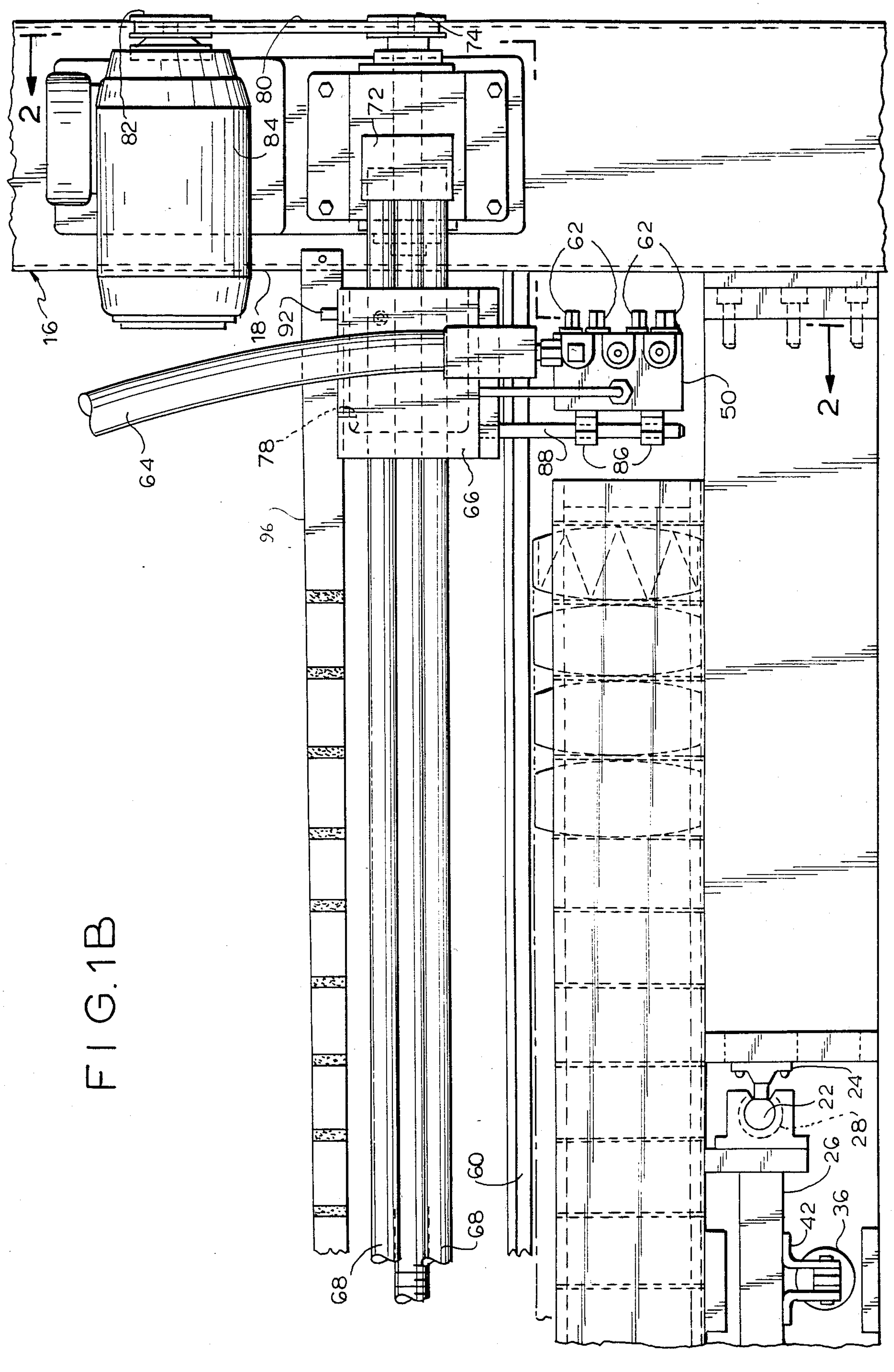
Figure 2:
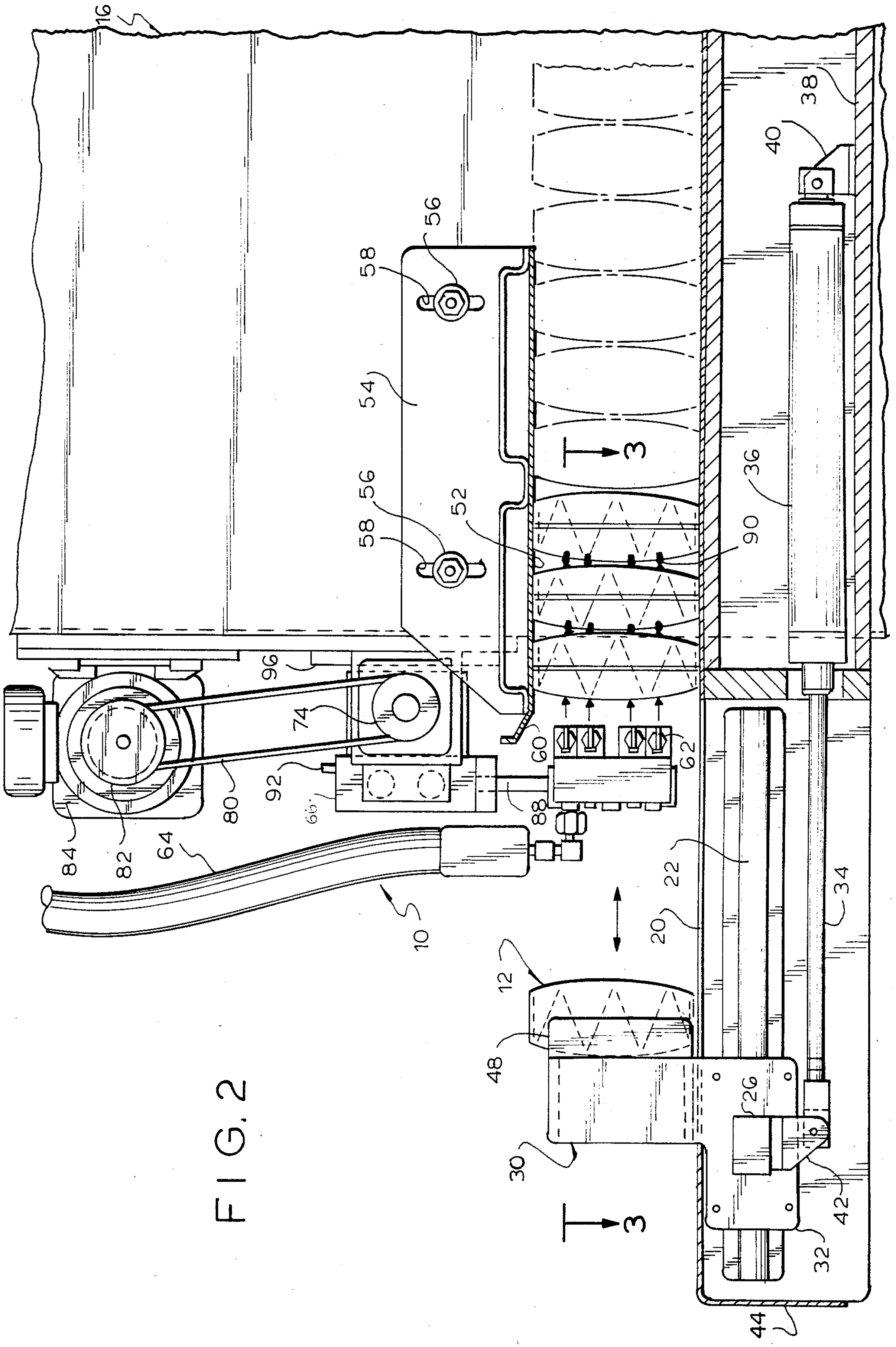
FIG. 2 is a partially sectional side elevation view thereof.
Figure 3:
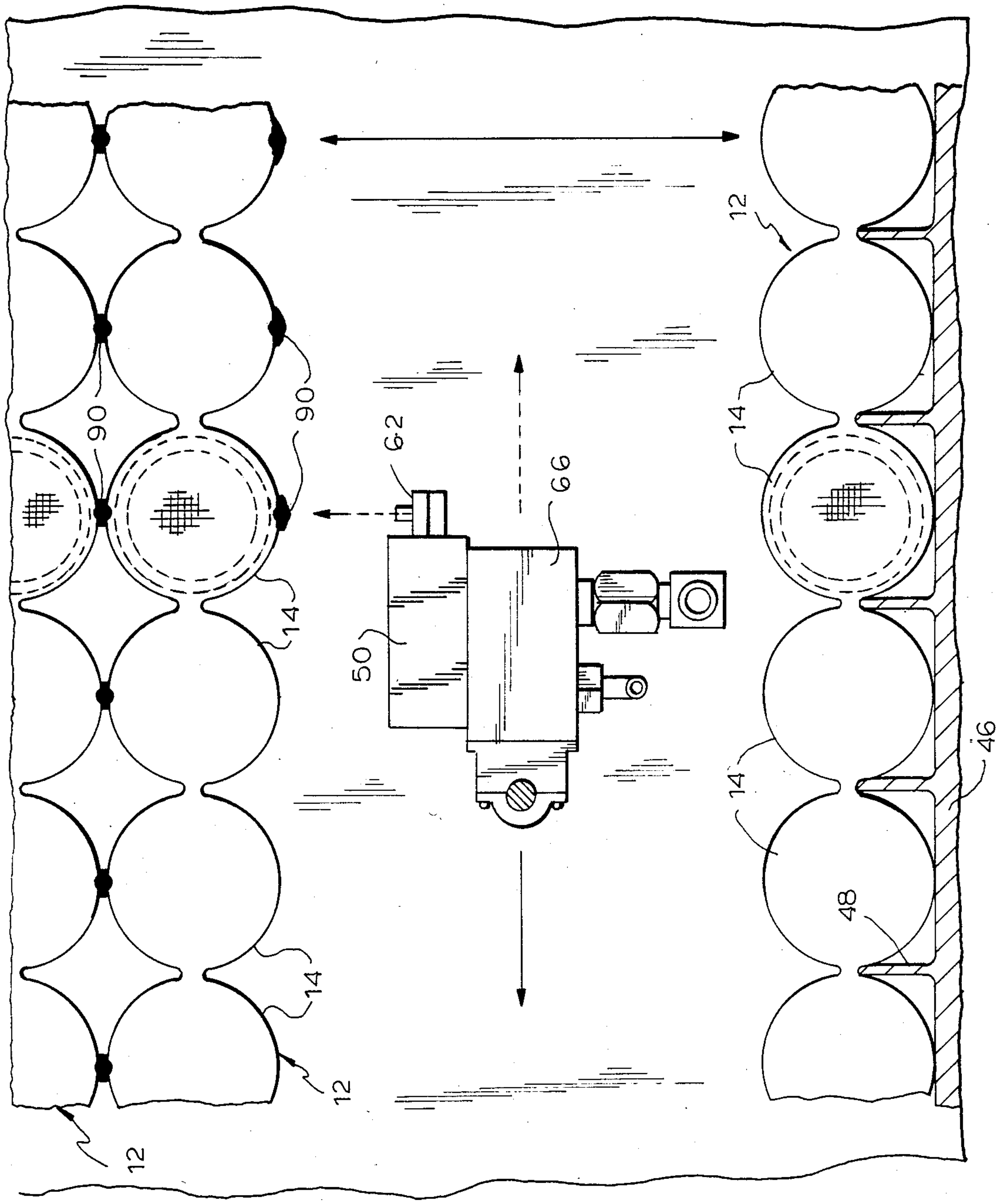
FIG. 3 is a top plan view of a portion thereof.

An apparatus 10 for assembling rows 12 of pocketed coil springs 14 into an innerspring construction is illustrated in FIGS. 1-3. Each row is preferbly manufactured in accordance with U.S. Pat. No. 4,234,983 which is incorporated by reference herein. The patented construction includes a plurality of coil springs positioned between the plies of a folded fabric strip. Individual pockets for each spring are formed by ultrasonically sealing the strip at preselected intervals. An apparatus for manufacturing a row of such coils is disclosed in U.S. Pat. No. 4,439,977.

The apparatus 10 includes a frame 16 having a pair of cabinets 18 for housing various electronic controls. The frame supports a substantially horizontal platform 20 having a smooth upper surface. A pair of guide bars 22 are mounted beneath the platform to a pair of support members 24. An elongate member 26 having bearings 28 secured at each end is slidably mounted to the guide bars 22. The bars 22 fit within the respective bearings.

A coil spring pushing fixture 30 is secured to member 26 by a pair of mounting plates 32 extending through a pair of slots (not shown) within the platform 20. This fixture is moved back and forth with respect to the platform by a pair of piston rods 34 extending, respectively, from a pair of pneumatic cylinders 36. The cylinders are pivotably mounted to horizontal frame surfaces 38 by a bracket 40. The ends of the piston rods 34 are pivotably mounted to the elongate member 26 by second pivot brackets 42. Operation of the cylinders is controlled by a pair of buttons (not shown) mounted to the front apron portion 44 of the frame. Once the buttons are pushed, a series of sequential steps is performed by the apparatus. These steps are discussed later in detail.

The pushing fixture 30 is specially constructed to move an upright row of coils from the front of the platform 20 to a bonding station. It includes a substantially vertical front wall 46 from which a plurality of dividers 48 extend. The dividers extend substantially perpendicularly from the front wall and define a plurality of sections therewith. As shown in FIG. 3, each divider 48 is separated by a distance approximating the diameter of each coil spring 14. If barrel-shaped coil springs are employed, this distance approximates the largest diameter thereof.

The dividers 48 each have a length of about half the coil diameter to allow them to fit between each pocketed spring 14 of a row 12. The construction of the pushing fixture 30 allows an upright row of coils to be moved while maintaining it in a straight line and preventing rotational displacement of any individual spring. Each coil spring is accordingly precisely positioned with respect to the corresponding coil spring in the row preceding it.

Referring to FIG. 2, each row 12 of pocketed coil springs is moved to the bonding station where it is treated by a hot melt applicator 50. The station includes a substantially horizontal surface which may be defined by a portion of platform 20. It also includes a substantially horizontal pressure plate 52 having vertically extending side portions 54. The plate is adjustable in height for different coil heights by means of nut and washer assemblies 56. These assemblies are mounted within slots 58 in the vertical side portions 54 and retained by holes (not shown) provided in the apparatus frame 16. The front end 60 of the plate is angled upwardly to facilitate the insertion of the rows 12 in the longitudinal opening defined between platform 20 and plate 52. Since each row should be held firmly in place while at the bonding station, the distance of the plate from the platform should preferably be slightly less than the height of the pocketed coil springs to be positioned therebetween. The length of the plate should also be sufficient to allow at least two rows to be held between it and the support. This allows an incoming row to be firmly pressed against a row that has already been treated by the applicator 50. Preferably a number of rows are held between these members at any given time to increase the pressure between rows and to maintain them in firm contact for enough time to insure adequate bonding.

The hot melt applicator 50 includes a plurality of spray nozzles 62, each of which is rotatable so that it may apply hot melt to a selected portion of each pocketed coil spring. A flexible, heated tube 64 is provided for supplying hot melt to the applicator from a heated reservoir (not shown) positioned on top of the frame. The tube 64 should have sufficient slack to allow the applicator to travel from one side of the apparatus to the other.

The applicator 50 is mounted to a block 66 having first and second cylindrical passages therethrough. A pair of smooth, stationary guide bars 68 extend through the two passages and are secured to brackets 70, 72 at each side of the frame 16. A linear bearing (not shown) or other equivalent structures may be provided within each passage for minimizing friction between them and the smooth bars 68.

A ball screw 73 extends between a belt-driven pulley 74 mounted to one side of the frame 16 and a fixture 76 including a bearing or bushing (not shown) mounted to the other side. A ball nut assembly 78 is secured to the block 66 and travels back and forth along the ball screw as it is rotated by the pulley 74. The screw 73 has about a one and one-quarter inch pitch. The speed at which the block, and therefor the applicator 50 travel are functions of the pitch of the screw and its speed of rotation about its longitudinal axis. Both variables may be adjusted as desired.

The rotational velocity of the ball screw is controlled by a timing belt 80 connected between pulley 74 and a pulley 82 driven by an electric motor 84. The ball nut assembly 78, and therefor the block 66 and applicator 50, are caused to travel at a selected speed. When the applicator reaches either end of its path, the motor 84 is reversed and the ball screw 73 is driven in the opposite direction.

Vertical positioning of the applicator 50 is accomplished by loosening the clamps 86 which secure it to rod 88. Hot melt 90 is applied as a series of horizontal lines, the vertical locations of which are controlled by the position of the applicator and the orientation of the nozzles 62 thereon. The thickness of each line is exaggerated in FIG. 3 for illustrative purposes. The length of each line is controlled by the duration of time each nozzle is actuated as it passes by the row of springs. This duration is controlled by a beam switch 92 mounted to the block. The switch detects the presence or absence of a series of dark, vertical stripes 94 on an elongate bar 96 which traverses the frame 16. The nozzles may either be immediately actuated upon detection of such a stripe or operate with a delay. Use of a delay circuit alows the horizontal positioning of the hot melt to be controlled by adjusting the delay time. Alternatively, the opposite side of the bar 96 may be provided with a different arrangement of vertical stripes. By simply removing the bar and mounting it with the opposite side forward, horizontal positioning of the hot melt can be changed to another location. The length of each hot melt strip 90 is proportional to the width of each stripe 94.

An innerspring assembly is manufactured in accordance with the invention by first making the necessary adjustments to accommodate the size of the coil springs to be employed. The height of the pressure plate 52 with respect to the platform 20 is set so that it will slightly compress each row of springs and thereby hold them in position. The vertical position of the hot melt applicator and orientation of the nozzles thereon are also set to apply hot melt to the appropriate location on each pocketed coil spring. The nozzles are each between one half and three quarters of an inch from the fabric covers about each spring. These distances may be varied depending upon the viscosity of the hot melt employed.

An appropriate pushing fixture 30 is employed having dividers 48 separated by distances approximately equal to the maximum diameter of the coil springs. Several of such fixtures may be maintained with each apparatus to allow it to assemble coil springs of various sizes.

A bar 96 having stripes 94 separated by a selected distance is mounted to the frame so that it will be detected by the beam switch 92. If the rows 12 of coil springs employed are narrower than the width of the apparatus, the bar 96 may only have stripes 94 corresponding to the actual number of coil springs in each row.

The hot melt reservoir (not shown), feed tube 64, and applicator 50 are all heated to allow the hot melt to flow easily. A polyamide hot melt may be employed upon a polypropylene, nonwoven fabric in which the coil springs are encased. DUON fabric, a trademarked product of Phillips Fibers Corporation of Greenville, S.C. may be treated with hot melt without being damaged by the heat and is accordingly a good spring pocket material.

A first row 12 of pocketed coil springs is mounted upright upon the platform 20 and against the pushing fixture 30 as shown in FIG. 3. Cylinders 36 are actuated to move the row between the platform 20 and the pressure plate 52. Upon reaching this position, the pushing fixture 30 is withdrawn, either automatically or manually, to its original position. A second row 12 is then positioned against the pushing fixture 30. The buttons are pushed to activate the electric motor 84 which turns the ball screw and thereby cause the applicator 50 to traverse the row 12 of springs. If four nozzles 62 (as shown) are employed, a series of four horizontal lines of hot melt will be formed on the pocket material encasing each coil spring. Each nozzle is actuated as the beam switch detects the presence of a dark stripe 94 on an otherwise light bar 96. When the applicator reaches the opposite end of its path, it opens a switch (not shown) and thereby deactuates the electric motor 84. Microswitches are positioned near each end of the bars 68 for this purpose.

Upon completion of the hot melt application, one of a second pair of switches (not shown) located near each end of the bars 68 is closed whereby the cylinders 36 are actuated to move the second row 12 between the pressure plate 52 and the platform 20, thereby displacing the first row. The compression of the springs therebetween provides frictional resistance to displacement of either row. Each new row 12 is pressed against the preceding row with sufficient force to insure a good bonding. Upon withdrawal of the pushing fixture 30, another row 12 may be positioned thereagainst and the above steps repeated. Upon pressing the buttons again, the ball screw is rotated in the opposite direction from its previous movement.

The above process is repeated until a sufficient number of rows have been connected to define an innerspring construction of selected size. The next construction is started simply by skipping the application of hot melt during one cycle of the apparatus. The two adjacent rows defining the ends of a pair of innerspring constructions accordingly will not be bonded together.

One of the advantages of the invention is that each row of pocketed coil springs does not necessarily have to include interconnected pockets. Although they are normally manufactured to have this construction, breakage can result in rows shorter than actually desired. While such rows would be unusable in most previously known methods of innerspring assembly, the invention allows row segments or even individual pocketed coil springs to be positioned between the dividers 48 of the pushing fixture 30 and secured to a previously treated row. Other advantages of the invention will be appreciated by those skilled in the art.

What is claimed is:

1. An apparatus for manufacturing innerspring constructions from rows of pocketed coil springs, comprising:

support means for supporting a plurality of rows of pocketed coil springs;

applicator means for applying a bonding material to a row of pocketed coil springs;

moving means for moving said applicator means longitudinally along a row of pocketed coil springs supported by said support means; and pressure means for applying pressure between two adjacent rows of pocketed coil springs after said applicator means has applied a bonding material between them.

2. An apparatus as defined in claim 1 including row positioning means, said row positioning means including a plurality of equidistantly spaced members for insertion between each pocketed coil spring comprising a row of said springs.

3. An apparatus as defined in claim 1 including a pressure plate mounted above and parallel to said support means.

4. An apparatus as defined in claim 3 including means for adjusting the position of said pressure plate with respect to said support means.

5. An apparatus as defined in claim 3 including a longitudinal opening defined between said pressure plate and said support means, said applicator means being movable by said moving means along a path adjacent to said longitudinal opening.

6. An apparatus as defined in claim 5 including means for inserting a row of pocketed coil springs through said longitudinal opening.

7. An apparatus as defined in claim 6 wherein said insertion means includes a substantially vertical front wall and a plurality of equidistantly spaced dividers extending therefrom, said support means and said pressure plate each being substantially horizontal.

8. An apparatus as defined in claim 5 including an elongate bar positioned outside of said longitudinal opening, a support block slidably mounted to said bar, said applicator means being mounted to said support block.

9. An apparatus as defined in claim 8 including means for adjusting the position of said applicator means with respect to said support block.

10. An apparatus as defined in claim 8 including a rotatable ball screw running parallel to said elongate bar, and a ball nut assembly mounted to said support block and engaging said ball screw.

11. An apparatus as defined in claim 5 including an elongate bar positioned outside said longitudinal opening, said bar including a plurality of markings thereon, and means for detecting said markings and actuating said applicator means upon the detection of each of said markings.

12. An apparatus as defined in claim 1 wherein said applicator means is a hot melt applicator including a plurality of spray nozzles.

13. An apparatus for manufacturing innerspring constructions from rows of pocketed coil springs, comprising:

a support surface;

a pressure plate positioned above and parallel to said support surface, said pressure plate and said support surface defining a longitudinal opening;

means for inserting a row of pocketed coil springs in an upright position between said pressure plate and said support surface through said longitudinal opening; and applicator means for applying a bonding material to a row of pocketed coil springs positioned between said pressure plate and said support surface.

14. An apparatus as defined in claim 13 including means for adjusting the position of said pressure plate with respect to said support surface.

15. An apparatus as defined in claim 13 wherein said applicator means is a hot melt applicator including a plurality of spray nozzles.

16. An apparatus as defined in claim 13 wherein said insertion means includes a plurality of equidistant dividing members which fit between each of the pocketed coil springs defining a row of coils, and means for moving said insertion means toward and away from said longitudinal opening.

17. An apparatus as defined in claim 13 including means for moving said applicator means parallel to said longitudinal opening.

18. An apparatus as defined in claim 17 including an elongate bar having a plurality of markings thereon, and means for detecting said markings and actuating said applicator means upon the detection of each of said markings.

19. An apparatus as defined in claim 17 including means for adjusting the distance of said applicator means from said support surface.

20. An apparatus as defined in claim 13 including a guide bar running parallel to said support surface; a support member mounted to said guide bar, said applicator means being mounted to said support member; a ball screw running parallel to said guide bar; a ball nut assembly mounted to said support member and engaging said ball screw; and means for rotating said ball screw.

21. A method for manufacturing innerspring assemblies comprising:

providing a first row of pocketed coil springs;

compressing said first row along the respective longitudinal axes of said coil springs, thereby maintaining said first row in an upright position;

applying bonding material to said first row; and moving a second, upright row of pocketed coil springs into contact with said first row, thereby bonding said first and second rows together.

22. A method as defined in claim 21 wherein said bonding material is a hot melt material.

23. A method as defined in claim 22 wherein said hot melt material is applied as a series of parallel lines to each pocketed coil spring in said first row, each line extending partially about the axis of each of said coil springs defining said row.

24. A method as defined in claim 21 including the step of moving said first row between a pair of parallel surfaces, thereby compressing it along the longitudinal axis of said coil springs, and moving said second, upright row between said pair of parallel surfaces, thereby compressing said second row while displacing said first row, said first row being maintained between said surfaces as it is displaced.

25. A method as defined in claim 24 wherein each of said pocketed coil springs is connected by a fabric strip which also encases each of said coil springs within individual pockets, including the step of moving said second row into contact with said first row by pushing said second row at points between each of said pockets, thereby maintaining said pockets in a straight line.

* * * * *